United States Patent [19]
Von Hellens et al.

[11] Patent Number: 4,645,793
[45] Date of Patent: Feb. 24, 1987

[54] EPDM ELASTOMERIC COMPOSITIONS

[75] Inventors: Walter Von Hellens, Bright's Grove; Sheikh A. H. Mohammed, Sarnia, both of Canada; Robert Hallman, Medina, Ohio

[73] Assignee: Polysar Limited, Sarnia, Canada

[21] Appl. No.: 810,770

[22] Filed: Dec. 19, 1985

[51] Int. Cl.[4] .......................... C08K 5/01; C08L 7/00; C08L 9/00; C08L 9/06
[52] U.S. Cl. .................................. 524/518; 524/476; 524/525; 525/211; 525/236; 152/525
[58] Field of Search ............... 525/211, 236; 524/518, 524/526, 476; 152/525

[56] References Cited

U.S. PATENT DOCUMENTS 3,630,974 12/1971 Ladocsi et al. .
3,706,819 12/1972 Usamoto et al. .................... 525/211
3,830,274 8/1974 Waser, Jr. .
4,003,420 1/1977 Sandstrom et al. ................. 525/211
4,051,083 9/1977 Newman ............................. 525/211
4,224,196 9/1980 Gursky .
4,316,825 2/1982 Wirth ................................... 525/211
4,464,500 8/1984 Diamond et al. ................... 525/211

Primary Examiner—Allan M. Lieberman
Attorney, Agent, or Firm—Stevens, Davis, Miller & Mosher

[57] ABSTRACT

Elastomeric compositions containing EPDM elastomers are provided, the vulcanizates of which show substantially improved adhesion properties with good dynamic ozone resistance, superior aged fatigue life and high resilience. The EPDM used is of high molecular weight and has a non-conjugated diene content of at least 6 weight percent preferably at least 7.5%. The composition also contains highly unsaturated elastomers, such as natural rubber and polybutadiene, as the additional elastomeric components.

13 Claims, No Drawings

EPDM ELASTOMERIC COMPOSITIONS

FIELD OF THE INVENTION

This invention relates to synthetic rubber compositions and vulcanizates thereof. More particularly, the invention relates to elastomeric compositions comprising mixtures of ethylene-propylene-non-conjugated diene elastomeric polymers and other highly unsaturated elastomeric polymers, and vulcanizates thereof, particularly suitable for use in pneumatic tire sidewalls.

BACKGROUND OF THE INVENTION

Ethylene-propylene elastomeric copolymers (EPR) and ethylene-propylene-non-conjugated diene terpolymer elastomers (EPDM) have been known and commercially available for many years. They possess a variety of inherently satisfactory properties as elastomers which has enabled them to find utility in many commercial areas. Among their satisfactory inherent properties are their resilience, ozone resistance and fatigue life after vulcanization, which would ordinarily render them well suited for use in tire sidewalls, especially in the upper sidewall area immediately adjacent to the tread where a very large amount of flexing is encountered in service. A further important requirement for an elastomer for use in tire sidewalls is good cured adhesion to adjacent rubber compounds of the tire, i.e. carcass compounds and tread compounds. EPDM is normally deficient in such cured adhesion. Accordingly, it is common practice to use blends of unsaturated elastomers (polybutadiene, natural rubber and the like) for sidewall compounds, containing appropriate antioxidants, antiozonants and waxes to confer the necessary long term protection on the sidewalls made therefrom. Such chemical additives, however, have a tendency to decay or migrate over time, and thus lose their effectiveness. An elastomeric polymer compound which inherently possessed the necessary degree of resistance to ozone, oxygen and heat would be a desirable replacement. EPDM rubbers inherently possess these properties, but suffer from the above mentioned deficiency of lack of cured adhesion.

DESCRIPTION OF THE PRIOR ART

Attempts have previously been made, to prepare elastomeric compositions including EPDM and other elastomers for use in sidewalls, so as to take advantage of the inherent properties of the EPDM and at the same time overcome the adhesion problem.

U.S. Pat. No. 3,630,974 (Ladocsi et al) discloses a composition which provides a vulcanizate with good dynamic ozone resistance and heat-flex resistance, provided by compounding an amount of halobutyl rubber, i.e. 25–30 weight percent, with high unsaturation rubber and a terpolymer comprised of ethylene, lower 1-alkene and a non-conjugated diene, i.e. an EPDM. The EPDM polymer used in the compositions of Ladocsi et al comprises 20–80% by weight ethylene, 75–15% by weight of $C_3$–$C_{10}$ 1-alkene (normally propylene) and no more than 20% by weight of the diene, most preferably 0.1 to 5 mole percent. In the sidewall composition as a whole, the EPDM polymer represents 15–30% by weight.

U.S. Pat. No. 3,830,274 (Waser) discloses an elastomer blend and a pneumatic tire sidewall prepared therefrom which comprises 20–60% weight percent of either natural or synthetic cis-1,4-polyisoprene compounded with 20–35 weight percent of an EPDM polymer and with from 20–45 weight percent of bromobutyl rubber having specific characteristics. The EPDM component of the invention is defined in preferred terms as having the following constitution: ethylene to propylene ratio of 50:50 to 75:25 based on weight and from 2–10 weight percent units of non-conjugated diene. Use of such a sidewall composition allegedly provides an improved hot flex life and carcass adhesion properties.

In U.S. Pat. No. 4,224,196 (Gursky) there is disclosed a pneumatic tire sidewall composition which comprises a halobutyl rubber, a high unsaturation rubber and an oil extended EPDM polymer. The EPDM polymer component of the disclosed composition is described as comprising ultra high molecular weight polymers which have prior to oil extension a Mooney viscosity in excess of about 100° at 260° F., an ethylene content of between 50 and 75% and a diene level of from 3% to 12%. Naphthenic and paraffinic oils, in amounts from 25 to 150 parts by weight per hundred parts by weight of polymer, are used for EPDM oil extension.

SUMMARY OF THE INVENTION

The present invention provides a novel elastomeric composition based upon specific EPDM elastomers, of improved cured adhesion, and useful for entire sidewalls and elsewhere. The composition comprises a specific EPDM of high bound unsaturation and high molecular weight together with one or more high unsaturation rubbers.

Thus in accordance with the present invention, there is provided an elastomeric polymer composition comprising, as the sole polymeric elastomer components, at least one highly unsaturated rubbery polymer and a high molecular weight EPDM polymer having a bound non-conjugated diene content of from about 6.0 to about 15 weight percent of the EPDM, the EPDM polymer constituting from about 10 to about 50 parts by weight per 100 parts by weight of total elastomers and the vulcanizate obtained from such elastomeric polymer composition.

As used herein, the term "high molecular weight EPDM polymer" means a polymer which, without oil present, has a Mooney viscosity (measured as ML 1+8 at 100° C.) of greater than about 150 and an ethylene:propylene weight ratio of about 50:50 to about 75:25, preferably from about 60:40 to about 75:25. It should be noted that actual measurement of the Mooney viscosity cannot be made because the viscosity is so high but the measurement does show it to be above about 150.

DESCRIPTION OF THE PREFERRED EMBODIMENTS

Compositions described herein according to the present invention have been found to exhibit surprisingly high cured adhesion properties, at least equivalent to those obtained with commercially used sidewall compositions based on natural rubber and polybutadiene blends. In addition, the vulcanizates of the compositions as described herein exhibit superior dynamic ozone resistance, superior aged fatigue life and higher resilience as compared to the prior art and/or commercially used materials, thus rendering the compositions of the invention particularly suitable for use in making pneumatic tire sidewalls.

The highly unsaturated rubbery polymers useful in this invention include natural rubber and the synthetic rubbers such as polybutadiene especially the high 1,4- polymers and most especially the high cis-1,4-polymers, SBR (rubbery copolymers of styrene and butadiene containing from about 12 to about 30, most preferably from about 15 to about 25, weight % of bound styrene), and cis-1,4-polyisoprene. Such polymers and copolymers are sulfur vulcanizable and commonly used in manufacture of pneumatic tires. The preparation of the synthetic rubbers and the properties of such highly unsaturated rubbery polymers are well known in the art.

The high molecular weight EPDM polymers of this invention are of high molecular weight as defined above, have an ethylene:propylene weight ratio of about 50:50 to about 75:25, preferably from about 60:40 to about 75:25 and at least about 6 and preferably at least about 7.5, most preferably at least about 9 and up to about 15 weight percent of bound non-conjugated diene based on the total EPDM. Suitable such non-conjugated dienes include straight chain and cyclic dienes such as 1,4-hexadiene, ethylidene norbornene, norbornadiene, methylene norbornene, dicyclopentadiene, 2-methyl norbornadiene, 5-vinyl 2 norbornene and the like. Especially preferred among such dienes is ethylidene norbornene. Preferably, the EPDM has a non-conjugated diene content of 7.5–15 weight percent. Methods for production of such EPDM polymers are well documented in the art. The EPDM polymer component used in the present invention has a Mooney viscosity (ML 1+8 at 100° C.) of greater than about 150, prior to oil extension. Preferably the amount of EPDM polymer in the elastomeric composition is from about 15 to about 40 parts by weight per 100 parts by weight of total elastomers.

In a preferred embodiment of the invention, for ease and efficiency of mixing the polymers the high molecular weight EPDM polymer is provided as an oil extended polymer prior to mixing with the other polymers. The EPDM may be oil extended by the well known procedures of oil extending polymers by adding oil to the polymer solution from the polymerization reactors and recovering the oil extended polymer: the oil is selected from the naphthenic or paraffinic oils, in amounts from about 50 to about 150 parts by weight of oil per 100 parts by weight of EPDM polymer. Alternatively, the oil can all be separately added to the high molecular weight EPDM polymer during the process of mixing of the polymers.

The compositions according to the invention can be prepared by the well known methods for mixing of rubbery polymers including mixing on a rubber mill or in internal mixers such as a Banbury mixer. In the compounding procedure, the conventional compounding ingredients are incorporated. Such compounding ingredients may include one or more types of carbon black, additional extender oil, other fillers such as clay, silica, and the like, tackifiers, waxes, bonding resins and the like, zinc oxide, antioxidants, antiozonants, processing aids, and the cure active agents. Generally, it is preferred to add the cure active agents in a second stage of compounding which may be on a rubber mill or in an internal mixer operated at a temperature normally not in excess of about 60° C. The cure active agents may include sulphur and the various sulphur containing accelerators. The compounds are cured in a conventional manner by heating for from about 5 to about 60 minutes at temperatures of from about 150° to about 200° C. to form novel elastomeric vulcanizates having useful properties as described herein. Specific embodiments of the invention are hereinafter described, by way of illustration only.

EXAMPLE 1

An elastomeric formulation according to the present invention, and consisting of a high molecular weight, high ethylidene-norbornene content EPDM, high cis-1,4-polybutadiene and natural rubber as the only elastomers, was prepared, cured and tested. For comparison purposes, a formulation including chlorobutyl rubber, as described in U.S. Pat. No. 4,224,196 Gursky (see example 2, composition H thereof), was also prepared, cured and similarly tested.

In the formulation according to the invention, the EPDM used was an oil extended EPDM designated EPDM 5875, sold by Polysar Limited, Sarnia, Ontario, Canada. This polymer has an ethylene:propylene weight ratio of 74:26, and contains 9.5 weight percent, based on the EPDM, of ethylidene norbornene and was an oil extended polymer containing 100 parts by weight of naphthenic oil per 100 parts by weight of EPDM. The polymer prior to oil extension was of very high molecular weight (Mooney viscosity ML 1+8 at 100° C. in excess of 150). In both formulations, the high cis-1,4-polybutadiene was TAKTENE® 1203, from Polysar Limited. The natural rubber used was that designated as SMR-CV.

In the formulation based on the Gursky patent, the chlorobutyl rubber was HT 1066 from Exxon Corporation, and the EPDM was EPDM 5465 from Polysar Limited. EPDM 5465 has an ethylene:propylene weight ratio of 63:37 and contains 4.3 weight percent ethylidene norbornene. It is oil extended 100% with naphthenic oil, and has Mooney viscosity ML 1+8 at 100° C. in excess of 150 prior to oil extension. The tackifier was a petroleum based resin sold under the tradename Escorez 1102 and the antioxidant was polymerized 1,2-dihydro-2,2,4-trimethyl quinoline sold under the tradename Flectol H.

A masterbatch containing the components (in parts by weight) given in Table 1 was prepared. The polymers were added to the Banbury (initially at 50° C.), and the remaining ingredients added after 1 minute of mixing. After four minutes of mixing the Banbury was swept and after five minutes the masterbatch was dumped. The curative system (in parts by weight) was added to the masterbatch formulations on a mill at 50° C. as follows, in which Accelerator-1 was N-oxydiethylene benzothiazole sulphenamide, Accelerator-2 was an alkyl phenol disulphide sold under the tradename Vultac #5 and Accelerator-3 was benzothiazyl disulphide.

TABLE 1

| | FORMULATION 1 | FORMULATION 2 |
|---|---|---|
| Natural rubber | 50 | 20 |
| Polybutadiene | 20 | 30 |
| Chlorobutyl | — | 35 |
| EPDM 5875 | 60 | — |
| EPDM 5465 | — | 30 |
| Tackifier | 5.0 | — |
| Carbon black (N-660) | 50 | — |
| Carbon Black (N-339) | — | 20 |
| Carbon Black (N-774) | — | 20 |
| Stearic acid | 2.0 | 2.0 |
| Zinc oxide | 3.0 | 3.0 |
| Antioxidant | 1.5 | — |
| Accelerator-1 | 1.0 | — |
| Accelerator-2 | — | 1.25 |
| Accelerator-3 | — | 0.8 |

TABLE 1-continued

| | FORMULATION 1 | FORMULATION 2 |
|---|---|---|
| Sulphur | 1.75 | 0.3 |

Formulation 1 is in accordance with the present invention. Formulation 2 follows example 2 of U.S. Pat. No. 4,224,196 Gursky. The compound Mooney (ML 1+4 at 100° C.) of each compound was measured, and found to be 41.3 for formulation 1, and 69 for formulation 2.

The compounds were cured by heating for 30 minutes at 166° C. and various physical tests were performed on the respective vulcanizates. Whilst in respect of most test results, the vulcanizates were comparable to one another, the vulcanizate of formulation 1 was significantly superior in respect of its rebound characteristics (determined by the standard Goodyear-Healey test) and in respect of its adhesion.

Adhesion of the vulcanizates was tested using a modified version of the Pirelli Peel Test. In this procedure, a small slab of the rubber compound to be tested is placed in face to face contact with a similar slab of a control rubber compound, with a small teflon separator strip inserted into a marginal edge of the interface. Fabric layers are placed on both remote surfaces, and the assembly is cured; by heating for 30 minutes at 166° C. Then the force per unit-width required to pull the components apart at their mutual interface is measured at 100° C. and reported, in kiloNewtons per meter. When the adhesion is high, the separation sometimes occurs by tearing within the body of the rubber slabs under test. This is referred to as "stock tear", and represents a minimum value for the adhesion. In the present case, the control rubber compounds against which the test compounds were cured, were in one case a natural rubber compound representative of truck tire carcass compounds (truck carcass), and in the second case a natural rubber-SBR-polybutadiene blend compound representative of passenger tire carcass compounds (passenger carcass), with the results given in Table 2.

TABLE 2

| | FORMULATION 1 | FORMULATION 2 |
|---|---|---|
| Goodyear-Healey rebound | | |
| at 0° C. (%) | 61.0 | 42.0 |
| at R.T. (%) | 67.0 | 57.0 |
| at 100° C. (%) | 73.0 | 68.0 |
| Adhesion at 100° C. | | |
| truck carcass (kN/m) | 26.9 (stock tear) | 5.1 (interfacial separation) |
| passenger carcass (kN/m) | 24.4 (stock tear) | 3.6 (interfacial separation) |

EXAMPLE 2

Elastomeric formulations consisting of natural rubber (SMR-CV), polybutadiene and an EPDM elastomer, as the sole elastomers, were prepared and tested, the nature and characteristics of the EPDM elastomers being varied as between the different formulations. EPDM 585 is an ethylene-propylene-ethylidene norbornene terpolymer available from Polysar Limited, which is not oil extended, has an ethylidene norbornene content of 10.9 weight percent, an ethylene:propylene weight ratio of 62:38 and a Mooney viscosity (ML 1+8 at 100° C.) of about 55. EPDM 5875 and EPDM 5465 are as described in Example 1. EPDM Base is the base polymer of EPDM 5875 without any added oil. EPDM 6463 is an ethylene-propylene-ethylidene norbornene terpolymer available from Polysar Limited, which is oil extended with 50 parts by weight per 100 parts by weight of polymer of paraffinic oil, has an ethylidene norbornene content of 4.2 weight percent, an ethylene:propylene weight ratio of 68:32 and a Mooney viscosity (ML 1+8 at 150° C.) of about 40. EPDM 346 is an ethylene-propylene-ethylidene-norbornene terpolymer available from Polysar Limited, which is not oil extended, has a third monomer content of 4.3 weight percent, an ethylene:propylene weight ratio of 63:37 and a Mooney viscosity (ML.1+8 at 100) of about 33.

The specific formulations are given below in Table 3, all parts being parts by weight, Accelerator-4 being N-cyclohexyl-2-benzothiazole sulphenamide.

TABLE 3

| | FORMULATIONS | | | | | |
|---|---|---|---|---|---|---|
| | 3 | 4 | 5 | 6 | 7 | 8 |
| Natural rubber | 50.0 | 50.0 | 50.0 | 50.0 | 50.0 | 50.0 |
| Polybutadiene | 20.0 | 20.0 | 20.0 | 20.0 | 20.0 | 20.0 |
| EPDM 585 | 30.0 | — | — | — | — | — |
| EPDM 5875 | — | 60.0 | — | — | — | — |
| EPDM Base | — | — | 30.0 | — | — | — |
| EPDM 6463 | — | — | — | 45.0 | — | — |
| EPDM 5465 | — | — | — | — | 60.0 | — |
| EPDM 346 | — | — | — | — | — | 30.0 |
| Carbon black (N-660) | 50.0 | 50.0 | 50.0 | 50.0 | 50.0 | 50.0 |
| Oil (Circosol 4240) | 20.0 | 5.0 | 35.0 | 20.0 | 10.0 | 15.0 |
| Zinc Oxide | 3.0 | 3.0 | 3.0 | 3.0 | 3.0 | 3.0 |
| Stearic Acid | 2.0 | 2.0 | 2.0 | 2.0 | 2.0 | 2.0 |
| Accelerator-4 | 1.0 | 1.0 | 1.0 | 1.0 | 1.0 | 1.0 |
| Sulphur | 1.75 | 1.75 | 1.75 | 1.75 | 1.75 | 1.75 |

It will be noted that Formulation 5 differs from Formulation 4 only in that the EPDM in Formulation 4 is oil extended, whereas in Formulation 5 the equivalent base polymer is used and the equivalent amount of oil (30 parts) is added to the formulation.

The mixing procedure to form the masterbatches and the subsequent addition of the curative system was undertaken generally as described in Example 1, except that all the polymers, the stearic acid and half the carbon black were initially added to the Banbury (initially at 40° C.), and the remaining components (except the curative system) were added after 30 seconds mixing. The compounds were cured by heating for 30 minutes at 166° C. The resulting vulcanizates were tested for Goodyear-Healey rebound and adhesion as previously, and also for aged fatigue life using the Monsanto "fatigue to failure" (FTF) test. In this test, dumbbell shaped pieces of cured, aged rubber, of standard size, are gripped by their ends in the jaws of a test machine, and repeatedly stretched and relaxed. The number of stretching cycles to breaking of the samples is recorded, and averaged over twelve test samples. In this case, the samples were repeatedly stretched to 140% extension by use of cam #24.

The test results are given in Table 4.

TABLE 4

| | FORMULATIONS | | | | | |
|---|---|---|---|---|---|---|
| | 3 | 4 | 5 | 6 | 7 | 8 |
| Compound Mooney (ML 1 + 4 at 100° C.) | 29.0 | 37.5 | 33.0 | 34.5 | 36.5 | 32.5 |
| Adhesion at 100° C. (truck carcass) (kN/m) | 7.5 interfacial separation | 24.4 stock tear | 19.7 stock tear | 2.8 interfacial separation | 6.8 interfacial separation | 2.4 interfacial separation |
| Goodyear-Healey rebound (%) | | | | | | |
| at 0° C. | 64.7 | 65.2 | 64.7 | 66.7 | 65.2 | 61.9 |
| at R.T. | 69.0 | 70.1 | 69.6 | 69.6 | 70.1 | 65.7 |
| at 100° C. | 73.5 | 77.6 | 77.0 | 72.4 | 75.8 | 66.2 |
| Monsanto FTF cycles to failure aged 72 hours at 100° C. (kc) | 2.4 | 27.0 | 4.1 | 7.0 | 7.0 | 0.2 |

Of the above formulations, only Formulation 4 and Formulation 5 are in accordance with the present invention. They both show remarkable and unexpected increase in adhesion, by several fold, over any of the other comparative formulations tested. It was observed during the mixing of Formulation 5 that the presence of the non-oil-extended high molecular weight polymer EPDM Base did not lead to as good quality mixing as compared to when EPDM 5875 was used in Formulation 4. This demonstrates that the high molecular weight EPDM polymer is preferably oil extended to achieve a good overall balance of properties. The unsatisfactory results for adhesion and fatigue to failure obtained for Formulations 3, 6, 7 and 8 highlight the importance of using the defined high molecular weight EPDM polymer.

EXAMPLE 3

In this example, an EPDM-based elastomeric composition according to the invention (Formulation 9) was prepared by procedures previously described, vulcanized and tested, in comparison with a standard elastomeric composition (Formulation 10) representative of typical industrial tire sidewall compositions. The polybutadiene A used in Formulation 10 was a high cis-1,4-polybutadiene known as TAKTENE® 1220, obtained from Polysar Limited. The antiozonant used was that sold under the tradename Flexone 7L and the wax used was that sold under the tradename Sunolite 240. The vulcanizates were tested for adhesion, aged fatigue life and resilience by the methods previously described, and for DeMattia cut growth and dynamic ozone resistance in which test strips of the vulcanizates are extended from 0 to 25% elongation while in a chamber at 40° C. containing 50 ppm of ozone. The results are recorded as the time at which the samples broke or the number of cracks after testing for 168 hours, whichever comes first. The formulation and test results are given in Table 5.

TABLE 5

| | FORMULATION 9 | FORMULATION 10 |
|---|---|---|
| Natural rubber | 50.0 | 50.0 |
| Polybutadiene | 20.0 | — |
| Polybutadiene A | — | 50.0 |
| EPDM 5875 | 60.0 | — |
| Carbon black (N-660) | 50.0 | 50.0 |
| Oil (Circosol 4240) | 5.0 | 10.0 |
| Antioxidant | 1.5 | 2.0 |
| Wax | — | 3.0 |
| Tackifier | 3.0 | — |
| Antiozonant | — | 2.0 |
| Zinc Oxide | 3.0 | 3.0 |
| Stearic Acid | 2.0 | 2.0 |
| Sulphur | 1.75 | 1.75 |
| Accelerator-1 | 1.00 | 1.00 |
| Monsanto FTF cycles to failure aged for 168 hours at 100° C. (kc) | 66 | 0.9 |
| DeMattia cut growth samples aged for 168 hrs at 100° C. | | |
| cycles to 300% cut growth (kc) | 28 | 0.5 |
| cycles to 600% cut growth (kc) | 160 | 1.3 |
| Dynamic ozone rating | | |
| unaged | no cracks | broke at 120 hrs |
| after aged for 168 hrs at 100° C. | no cracks | broke at 72 hrs |
| Goodyear Healey rebound | | |
| at 0° C. (%) | 61.5 | 59.8 |
| at R.T. (%) | 66.7 | 64.2 |
| at 100° C. (%) | 74.6 | 70.1 |
| Adhesion at 100° C. | | |
| truck carcass (kN/m) | 28.0 | 28.0 (stock tear) |
| passenger carcass (kN/m) | 25.0 (stock tear) | 26.5 (stock tear) |

Compared to the industrial control (Formulation 10), the formulation according to the invention (Formulation 9) exhibits improved aged fatigue life, dynamic ozone resistance and higher resilience while maintaining excellent hot adhesion levels. These are all advantageous characteristics for pneumatic tire sidewalls.

EXAMPLE 4

In this example, the amount of EPDM polymer in the composition is varied from zero to 100 percent of the composition. The natural rubber and EPDM 5875 used were as described in Example 1. The formulations were prepared as described in Example 1 and are shown in Table 6 and were vulcanized by heating at 166° C. for 30 minutes. The properties of the vulcanizates are also shown in Table 6.

Inspection of the data in Table 6 clearly shows that Formulations 17 and 18, which are controls outside the scope of the invention, are very deficient in adhesion. Further, Formulations 12 to 16 inclusive have good adhesion properties compared to the control Formulation 11.

Compositions according to the invention are useful in a wide variety of applications where vulcanized elastomeric compositions have been used previously. Their primary application is in pneumatic tire sidewalls, where full advantage can be taken of their desirable properties of superior dynamic ozone resistance, superior aged fatigue life, high resilience and high cured adhesion. They can however advantageously be used in other parts of pneumatic tires also, where their dynamic properties may be utilized, e.g. tread and carcass compounds. They are also useful in other dynamic applications such as conveyor belts, hoses etc.

TABLE 6

|  |  | Formulation # | | | | | | | |
|---|---|---|---|---|---|---|---|---|---|
|  |  | 11 | 12 | 13 | 14 | 15 | 16 | 17 | 18 |
| Natural rubber |  | 100 | 90 | 80 | 70 | 60 | 50 | 40 | 0 |
| EPDM 5875 |  | — | 20 | 40 | 60 | 80 | 100 | 120 | 200 |
| Carbon black (N-660) |  | 50 | 50 | 50 | 50 | 50 | 50 | 50 | 50 |
| Oil (Circosol 4240) |  | 10 | 5 | 5 | 5 | 3 | 0 | 0 | 0 |
| Zinc oxide |  | 3 | 3 | 3 | 3 | 3 | 3 | 3 | 3 |
| Stearic acid |  | 2 | 2 | 2 | 2 | 2 | 2 | 2 | 2 |
| Sulphur |  | 1.75 | 1.75 | 1.75 | 1.75 | 1.75 | 1.75 | 1.75 | 1.75 |
| Accelerator-1 |  | 1 | 1 | 1 | 1 | 1 | 1 | 1 | 1 |
| Vulcanizate Properties |  |  |  |  |  |  |  |  |  |
| Tensile Strength | MPa | 17.9 | 16.7 | 15.7 | 15.4 | 15.2 | 17.2 | 17.9 | 13.0 |
| 300% Modulus | MPa | 8.5 | 8.0 | 6.5 | 4.9 | 4.0 | 4.0 | 4.0 | 4.1 |
| Elongation | % | 480 | 470 | 570 | 570 | 560 | 620 | 620 | 545 |
| Monsanto FTF cycles to failure |  |  |  |  |  |  |  |  |  |
| unaged | kc | 16.9 | 20.3 | 30 | 58.4 | 181 | 313 | 135 | 301 |
| aged 168 hrs at 100° C. | kc | 8.3 | 8.3 | 3.5 | 36.5 | 164 | 257 | 364 | 99 |
| Goodyear Healey Rebound |  |  |  |  |  |  |  |  |  |
| at 0° C. | % | 59.4 | 59.8 | 58.4 | 59.4 | 61.5 | 63.6 | 65.2 | 73.0 |
| at RT | % | 66.7 | 69.6 | 67.8 | 67.3 | 68.5 | 70.1 | 71.8 | 81.2 |
| at 100° C. | % | 75.2 | 76.2 | 74.6 | 74.1 | 74.6 | 74.1 | 75.8 | 87.2 |
| Adhesion at 100° C. truck carcass | kN/m | 13.2 | 21.6 | 22.1 | 21.4 | 19.3 | 15.5 | 2.5 | 0.4 |

What is claimed is:

1. An elastomeric polymer composition comprising, as the sole polymeric elastomer components, at least one highly unsaturated rubbery polymer selected from the group consisting of polybutadiene, SBR, cis-1,4-polyisoprene and natural rubber and a high molecular weight EPDM polymer having a bound non-conjugated diene content of from about 6 to about 15 weight percent of the EPDM, the EPDM polymer constituting from about 10 to about 50 parts by weight per 100 parts by weight of total elastomers, said EPDM polymer having a Mooney viscosity (ML 1+8 at 100° C.) of greater than about 150 and an ethylene:propylene weight ratio of from about 50:50 to about 75:25.

2. The composition of claim 1 wherein the EPDM polymer is an oil extended EPDM polymer containing from about 50 to about 150 parts by weight per 100 parts by weight of EPDM polymer of naphthenic or paraffinic oil and the EPDM polymer constitutes from about 15 to about 40 parts by weight per 100 parts by weight of total elastomers.

3. The composition of claim 1 which further contains from about 50 to about 150 parts by weight per 100 parts by weight of EPDM polymer of naphthenic or paraffinic oil and the EPDM polymer constitutes from about 15 to about 40 parts by weight per 100 parts by weight of total elastomers.

4. The composition of claim 2 wherein the bound non-conjugated diene component of the EPDM constitutes from about 7.5 weight percent to about 15 weight percent thereof.

5. The composition of claim 2 which further contains one or more types of carbon black, additional extender oil and cure active agents.

6. The composition of claim 4 wherein the non-conjugated diene component of the EPDM polymer is ethylidene norbornene.

7. The composition of claim 6 wherein the EPDM polymer has an ethylidene norbornene content of from about 9.0 weight percent to about 15 weight percent and an ethylene:propylene weight ratio of from about 60:40 to about 75:25.

8. The composition of claim 2 wherein the highly unsaturated rubbery polymer is a blend of high cis-1,4-polybutadiene and natural rubber.

9. The composition of claim 8 which further contains one or more types of carbon black, additional extender oil and cure active agents.

10. Vulcanizates of the composition of claim 5 prepared by heating the composition for a time of from about 5 to about 60 minutes at a temperature of from about 150° to about 200° C.

11. Vulcanizates of the composition of claim 9 prepared by heating the composition for a time of from about 5 to about 60 minutes at a temperature of from about 150° to about 200° C.

12. A pneumatic tire having a sidewall containing the vulcanizate of claim 10.

13. A pneumatic tire having a sidewall containing the vulcanizate of claim 11.

* * * * *